United States Patent [19]

Tungatt et al.

[11] Patent Number: 4,708,740
[45] Date of Patent: Nov. 24, 1987

[54] TECHNIQUE FOR FORMING SILICON CARBIDE COATED POROUS FILTERS

[75] Inventors: Paul D. Tungatt, Middletown; Derek E. Tyler, Cheshire; Harvey P. Cheskis, North Haven, all of Conn.

[73] Assignee: Olin Corporation, New Haven, Conn.

[21] Appl. No.: 691,618

[22] Filed: Jan. 14, 1985

Related U.S. Application Data

[63] Continuation-in-part of Ser. No. 599,098, Apr. 11, 1984, Pat. No. 4,537,627.

[51] Int. Cl.$^4$ .............................................. C22B 15/00
[52] U.S. Cl. ...................................... 75/76; 75/93 R; 266/227; 427/244; 501/80; 501/89; 210/510.1
[58] Field of Search ................. 75/63, 93 R; 427/244; 266/227

[56] References Cited

U.S. PATENT DOCUMENTS

| | | | |
|---|---|---|---|
| 2,715,063 | 9/1951 | Weiss | 75/68 |
| 3,039,864 | 6/1962 | Hess et al. | 75/67 |
| 3,172,757 | 3/1965 | Hess et al. | 75/67 |
| 3,175,918 | 3/1965 | McGahan et al. | 501/84 |
| 3,893,917 | 7/1975 | Pryor et al. | 210/69 |
| 3,947,363 | 3/1976 | Pryor et al. | 210/510 |
| 3,962,081 | 6/1976 | Yarwood et al. | 210/69 |
| 4,007,923 | 2/1977 | Chia | 266/217 |
| 4,024,056 | 5/1977 | Yarwood et al. | 264/44 |
| 4,075,303 | 2/1978 | Yarwood et al. | 264/44 |
| 4,257,810 | 3/1981 | Narumiya | 75/93 R |
| 4,258,099 | 2/1981 | Naruyima | 75/93 R |
| 4,265,659 | 5/1981 | Blome | 75/93 R |
| 4,277,281 | 7/1981 | Weber et al. | 75/93 R |
| 4,330,327 | 5/1982 | Pryor | 75/76 |
| 4,342,664 | 8/1982 | Blome | 252/313 R |
| 4,343,704 | 8/1982 | Brockmeyer | 210/509 |
| 4,426,287 | 1/1984 | Narumiya | 210/311 |
| 4,559,244 | 12/1985 | Kasprzyk | 427/244 |

*Primary Examiner*—Peter D. Rosenberg
*Attorney, Agent, or Firm*—Paul Weinstein

[57] ABSTRACT

The present invention relates to a technique for forming silicon carbide coated porous filters for use in filtering molten metal, especially copper and copper alloy melts. The technique comprises preparing a silicon carbide containing slurry having a viscosity in the range of about 1 to about 50, preferably from about 5 to about 30, centipoise and impregnating a rigid porous substrate material with the slurry. In a preferred embodiment, the slurry contains mono-aluminum phosphate as a binding agent, ethylene glycol as a wetting agent, powdered silicon carbide having a maximum settling rate of about 0.1 mm./min. and the balance essentially water. After draining of the excess slurry, the coated substrate material is heated to substantially prevent foaming of the coating during firing and fired to bond the silicon carbide coating to the substrate material.

13 Claims, No Drawings

TECHNIQUE FOR FORMING SILICON CARBIDE COATED POROUS FILTERS

This application is a continuation-in-part of U.S. patent application Ser. No. 599,098, filed on Apr. 11, 1984, now U.S. Pat. No. 4,537,627, to Derek E. Tyler et al. for TECHNIQUES FOR REMOVING IMPURITIES FROM A COPPER MELT.

The present invention relates to a filter for removing impurities and contaminants from molten metals and a process for forming the same.

Impurities and contaminants such as oxides, borides, carbides and unwanted intermetallics in a melt can lead to objectionable surface defects and undesirable inclusions in the final cast product. These surface defects and/or inclusions may render the cast product commercially unacceptable and/or interfere with commercial machining and fabrication practices. To prevent such difficulties, most melts are filtered to remove any unwanted impurities and contaminants. Generally, melt filtration is accomplished by passing the melt through a filter medium having a desired permeability. Typically, the filter medium takes the form of a porous body such as a bed filter or an open cell porous foam structure; however, it is also known to use powdered materials such as alumina, silica or clay powders to filter some types of melts. U.S. Pat. No. 2,715,063 to Weiss illustrates a melt filtration technique using powders as the filtering medium.

Bed filters typically consist of layers of different sized bed media placed within a molten metal conduit such as a transfer trough connecting a furnace and a casting mold. The type of bed media and the size of the bed media particles generally depend upon the type of impurities and contaminants to be removed from the melt. For example, it is known in the art to use materials such as alumina, silica, silicon carbide, chromite, fosterite, magnesia spinel, periclase, zirconia and coke as bed media. U.S. Pat. Nos. 3,039,864 and 3,172,757, both to Hess et al., and 4,330,327 to Pryor illustrate some of the bed filters known in the art.

The use of such bed filters, however, is not without problems. For example, the melt may have to be passed through a relatively long length of bed media to obtain effective filtration. If sufficiently long, the bed filter length could interfere with the ability to rapidly filter a given volume of molten metal. Other problems include the passage of too many solids, the strong tendency towards channeling which reduces filter efficiency, the changing of the pore size during use and the consequent reduction in molten metal flow caused thereby, the need to use a fluxing gas in conjunction with some bed filters to remove certain impurities, and the need to use special molten metal conduits to generate sufficient head pressure to obtain the desired molten metal flow through the filter.

In an attempt to avoid these problems, open cell ceramic foam filters have been used in lieu of bed filters. This type of filter generally comprises an open cell, hydrophillic, flexible organic foam impregnated with an aqueous ceramic slurry. The organic foam may be a cellulosic foam or a polymeric foam such as polyurethane foam. The filter is typically formed by immersing a pliant foam material in a ceramic slurry and repeatedly subjecting the foam material to compression and expansion to drain off the excess slurry material. After draining, the coated foam material is subjected to a drying operation followed by exposure to elevated temperatures to burn out or volatilize the flexible organic foam and sinter the ceramic coating. In forming these filters, it is important that a pliant material be used so that draining of the slurry can be effected by compression and expansion of the foam material. It is also important for the organic foam material to be of a type that burns out or volatilizes at a temperature below the firing temperature of the ceramic material. U.S. Pat. Nos. 3,893,917 and 3,947,363, both to Pryor et al., 3,962,081, 4,024,056 and 4,075,303, all to Yarwood et al., 4,257,810, 4,258,099 and 4,426,287, all to Narumiya, 4,265,659 and 4,342,664, both to Blome, 4,343,704 to Brockmeyer and 4,277,281 to Weber et al. illustrate some of the ceramic foam filters known in the art.

In U.S. Pat. No. 4,007,923 to Chia, a multi-stage technique for treating molten metals to remove solid and gaseous impurities is illustrated. In this technique, the molten metal flows through a series of successively arranged purification stages including a deslagging stage where the molten metal is filtered through a woven refractory filter, a fluxing stage, an adsorption stage where the molten metal is passed over a plurality of impurity-adsorbing refractory plates and a final filtration stage where the molten metal is filtered through a rigid porous refractory filter medium.

In addition to the foregoing filtration devices, it is known in the art to form filtering devices from foamed or porous silicon carbide materials. Such a filter may be formed by first preparing a mix containing silicon carbide grit, a resin binder and a pore forming material. After being formed into a desired shape, the mix is subjected to a heat treatment for setting the binder and carbonizing the resinous matrial. An approach for forming such a filter is illustrated in U.S. Pat. No. 3,175,918 to McGahan et al.

While open pore structures have been used to remove impurities from molten metals, they too have problems. The effectiveness of these filters is related to the minimum filter pore size which can be used and the operating conditions needed to obtain passage of the melt through the porous structure. As pore size decreases, the head of metal required to prime and sustain metal flow through these porous structures increases. For this type of filter to have commercial applicability, the head and other operating conditions must be reasonable. In the past, the use of some of these porous structures for filtering copper melts has been limited by relatively high priming head requirements and relatively low metal flow rates. Still other porous structures have had limited applicability because the smallest impurity which can be removed and still have reasonable operating conditions is about 200 $\mu$m. Impurities this size can cause significant defects in the final product. Accordingly, it is an object of the present invention to provide an improved molten metal filter and a method for forming the same.

It is a further object of the present invention to provide a filter as above which obtains high filtration efficiency.

It is a further object of the present invention to provide a filter as above which has particular utility in filtering copper and copper alloy melts.

These and other objects and advantages will become more apparent from the following description.

In accordance with the present invention, it has been found that the foregoing objects and advantages may be readily achieved. The present invention provides a highly efficient method of filtering molten metal, particularly copper and copper alloy melts, through a disposable high temperature resistant filter characterized by a rigid porous material having an open cell structure with a plurality of interconnected voids and a relatively thin, substantially uniform silicon carbide coating throughout. As pointed out in the parent application, it has been discovered that materials having exposed silicon carbide particles have particular utility in the filtration of copper and copper alloy melts. While the mechanism by which the silicon carbide acts to remove the unwanted impurities and contaminants from the melt is not completely understood, it is known that the unwanted impurities and contaminants can be removed by forming members through which the melt flows or with which the melt comes into contact from the silicon carbide containing materials. The filters of the present invention take full advantage of this discovery.

The filters of the present invention exhibit improved strength properties such as reduced friability and improved thermal conductivity through the formation of the relatively thin, substantially uniform silicon carbide coating throughout the porous substrate material. The filters of the present invention are preferably formed by impregnating the rigid porous substrate material with a slurry having a viscosity in the range of about 1 to about 50 centipoise and containing silicon carbide having a maximum settling rate of about 0.1 mm/min. It has been found that a silicon carbide containing slurry having these characteristics drains well from the substrate material, thereby reducing the number of clogged pores, and forms the desired silicon carbide coating. In a preferred embodiment of the present invention, the silicon carbide slurry has a viscosity in the range of about 5 to about 30 centipoise. In addition to the silicon carbide, the slurry preferably contains an inactive carrying medium, a binding agent and a wetting agent. The impregnating step may comprise either immersion of the rigid substrate material in the slurry, pouring of the slurry through the rigid substrate material or another suitable slurry application technique. After draining of any excess slurry, the impregnated rigid substrate material is furnace dried to substantially prevent foaming of the slurry coating material during firing and fired to bond the silicon carbide particles to the substrate material. Unlike other filter fabrication techniques, the filter forming process of the present invention does not require the use of pliant porous substrate materials and the burning out or volatilization of the underlying substrate material.

In accordance with the present invention, it has been found that it is possible to prepare low cost porous filtration media for molten metal using underlying porous substrate materials having larger pore sizes than can ordinarily be used. The ability to use larger pore size porous materials is due to the interactive nature of the silicon carbide coating applied to the substrate material. As a result, the filters of the present invention are less susceptible to clogging by non-metallic particulate and can be used with practical priming heads. Without the silicon carbon coating, the pore size required for effective filtration would be too small due to impractical priming heads. Since the filters of the present invention are extremely inexpensive to prepare, it is quite feasible to use these filters on a throw away basis.

In accordance with the present invention, a molten metal filter is formed by impregnating a porous ceramic body with a silicon carbide containing slurry and thereafter bonding the silicon carbide to the underlying ceramic material. While the present invention will be discussed in the context of providing a filter to be used in removing impurities and contaminants from copper and copper alloys melts, it should be recognized that the present invention has wider applicability and its broad scope should not be unduly limited.

The porous ceramic body used to form the underlying substrate material may comprise any suitable rigid porous ceramic filter material known in the art having an open cell structure with a plurality of interconnected voids. The filter material may have any desired shape and permeability or pore size. When filtering molten metals, it is desirable to use rigid materials rather than pliant materials. In a preferred embodiment of the present invention, a commercially available alumina foam filter sold under the name "SELEE" foam by Consolidated Aluminum Corporation of St. Louis, Mo. and having a pore size in the range of about 5 ppi to about 100 ppi, preferably from about 30 ppi to about 90 ppi, is used as the underlying substrate material. While the substrate material may have any desired thickness, it has been found that thicknesses of from about 1 to about 2 inches are preferred.

As previously discussed, it has been found that silicon carbide is particularly useful in removing impurities and contaminants from molten metal, especially from copper and copper alloy melts. The present invention takes advantage of this discovery by forming a relatively thin, substantially uniform silicon carbide coating throughout the underlying substrate material. In addition to improving filter efficiency, the silicon carbide coating strengthens the substrate material, reduces the friability of the substrate material and improves the thermal conductivity of the substrate material. The silicon carbide coating is preferably formed by first impregnating the rigid porous substrate material with an aqueous silicon carbide containing slurry. The impregnating step may comprise either immersion of the substrate material in the slurry or a pouring of the slurry through the substrate material. If desired, other slurry application techniques such as spraying may be used to impregnate the substrate material with the silicon carbide containing slurry.

It has been found that the slurry must have certain compositional characteristics and physical properties to form the desired silicon carbide coating. For example, the viscosity of the slurry and the settling rate of the silicon carbide contained therein are important to the formation of the desired coating. Complete drainage of any excess slurry is required to prevent the pores in the substrate material from becoming plugged, thereby reducing filter permeability and effectiveness. Consequently, the slurry must have a viscosity which permits it to flow freely through and drain freely from the substrate material. The settling rate of the silicon carbide material has an important influence on the slurry coating and draining characteristics and must be kept below a certain level. With regard to the compositional characteristics of the slurry, it has been found to be desirable for the slurry to contain an agent which enhances the bonding of the silicon carbide particles to the underlying substrate material and which forms a bond that remains stable in the presence of molten metal. It is also desirable for the slurry to contain a wetting or surface tension reducing agent which aids in the draining of the slurry from the substrate material.

In a preferred embodiment, the silicon carbide containing slurry comprises an inactive carrying medium, silicon carbide, a binding agent and a wetting agent. Preferably, the silicon carbide is in the form of a finely divided powder, which is commercially available as a silicon carbide flour, having a settling rate less than about 0.1 mm/min. As previously mentioned, the settling rate is important since it has a significant influence on the draining characteristics of the slurry. Rapid settling of the silicon carbide from the slurry during draining can cause silicon carbide products to remain inside the filter, clogging the pores and greatly reducing the permeability and the usefulness of the filter. While the settling rate is a function of silicon carbide type and the volume fraction in the slurry mixture, it is desirable from the standpoint of viscosity to have as low a volume fraction of silicon carbide in the slurry as possible.

While the binding agent may comprise any suitable binding agent known in the art, it is preferred to use a high temperature phosphate binding agent such as mono-aluminum phosphate. When heated such binding agents form a phosphate bond between the substrate material and the silicon carbide coating which remains stable in the presence of molten metal, especially molten copper. Similarly, the wetting agent may comprise any suitable surface tension reducing agent known in the art such as ethylene glycol. The wetting agent serves to reduce slurry surface tension, thereby aiding in the draining characteristics of the slurry. For the carrying medium, it has been found that water acts as a suitable carrying medium, although alcohol could be used as the carrying medium if so desired.

As mentioned above, it is desirable for the slurry to have a viscosity in the range of about 1 to about 50 centipoise so that effective slurry draining and formation of the desired thin even coat of silicon carbide over substantially all surfaces of the underlying substrate material can take place. Outside this viscosity range, the slurry is either too thick to effectively drain off or too thin to coat the substrate material. Preferably, the slurry has a viscosity in the range of about 5 to about 30 centipoise. It has been discovered that such a slurry may be provided by using the following slurry composition: from about 5% to about 20% powdered silicon carbide, about 2% to about 50% mono-aluminum phosphate, about 0.001% to about 0.1% ethylene glycol and the balance essentially water. In a preferred embodiment, the slurry composition consists essentially of about 10% to about 15% silicon carbide, about 10% to about 30% mono-aluminum phosphate, about 0.001% to about 0.01% ethylene glycol and the balance essentially water. The above percentages are by volume percentages.

In addition to the foregoing compositional ranges, it has been discovered that the ratio of the water to the binding agent in the slurry is significant. For example, a 1:1 ratio of water to binding agent produces a slurry that is too viscose. At the other extreme, if too much water is present, the silicon carbide in the slurry will not adhere to the filter material. While the outside limit of the water to binding agent ratio has not been firmly established, it has been found that it is desirable for the slurry to have a water to binding agent ratio of at least about 4:1.

Preparation of the slurry is achieved by mixing the liquid constituents together preferably at ambient temperature. In the aforementioned slurry compositions, this means that the water, the ethylene glycol wetting agent and the mono-aluminum phosphate binding agent would be mixed together. When using a phosphate binding agent, it is desirable to mix the constituents together in an acid resistant vessel. The silicon carbide is added to the liquid constituents while they are being stirred. Continuous stirring of the slurry is required to maintain the silicon carbide in suspension. It has been found to be desirable for the silicon carbide particles to be in suspension when the underlying substrate material is impregnated with the slurry.

When applying the slurry to the substrate material using the immersion techique, the substrate material should be immersed in the slurry until no bubbles are seen to rise to the surface from the substrate material. When using the pour through technique, it is desirable to pour the slurry through the substrate material several times so that a good coating may be obtained.

After the substrate material has been impregnated with the silicon carbide containing slurry, the excess slurry material is permitted to drain off. This may be done in any desired manner and for any desired period of time. For example, the impregnated substrate material may be suspended over a tank into which the excess slurry drains. Drainage of the excess slurry material is important to prevent plugging of the substrate material pores.

After draining, the impregnated substrate material is dried to substantially prevent foaming of the silicon carbide coating as a result of rapid boiling of the water during the subsequent firing process. This drying step may be performed in any suitable manner using any conventional drying apparatus known in the art and any conventional drying atmosphere known in the art. Preferably, the drying step is carried out by heating the impregnated substrate material in a furnace to a temperature in the range of about 300° F. to about 500° F. for a time in the range of about 1 to about 3 hours. While any suitable heat-up rate may be used, it is preferred that a rate in the range of about 50° F./hr. to about 150° F./hr be used. After drying, the coated material may be cooled at any desired rate. Preferably, the cooling rate is in the range of about 50° F./hr to about 150° F./hr.

Thereafter, the impregnated substrate material is fired to bond the silicon carbide particles to the substrate material. Here too, the firing step may be carried out using any suitable heating apparatus and any suitable atmosphere known in the art. Preferably, firing is performed by heating the impregnated substrate material to a temperature in the range of about 800° F. to about 2100° F. for about 1 to about 3 hours. In a most preferred embodiment, the impregnated substrate material is heated to a temperature in the range of about 1000° F. to about 1500° F. The firing step activates the binding agent in the manner previously described so that the silicon carbide particles are bonded to the porous material. As before, it has been found to be desirable to heat-up and cool down the coated filter material at a rate of about 50° F./hr. to about 150° F./hr.

After firing and cooling, the porous filter medium is ready to be used. The filters may be used in any conventional manner to filter molten metal. For example, one of the filters may be placed within a conduit such as a transfer trough connecting a source of molten metal such as a furnace and another piece of casting equipment such as a holding furnace or a casting mold. The molten metal may be passed through the filter in any desired manner. As previously mentioned, the filter of the present invention is particularly useful in the filtration of copper and copper alloy melts.

As can be seen from the foregoing description, the process of the present invention does not require any special equipment and is easy to perform. In addition, it does not require burning out of the underlying substrate material, subjecting the substrate material to compression and expansion cycles to remove excess slurry material, and/or the use of substrate materials having specifically defined porosities. Other advantages of the present invention include formation of a relatively thin, substantially uniform silicon carbide coating on substantially all surfaces of the substrate material which potentially contact the molten metal. By forming such a coating, the amount of silicon carbide which can contact the melt is maximized. Since there appears to be an attraction between silicon carbide and certain impurities and contaminants present in metal and metal alloy melts, overall filter efficiency is improved. Another advantage to the present invention is that the application of the slurry to the substrate material reduces the permeability of the underlying substrate material by less than about 10%. This means that there is no significant plugging of the pores in the substrate and no significant interference with the filtering ability of the substrate material.

In addition to the foregoing, the filter forming technique of the present invention can be used with porous substrate materials having any desired permeabilty. This is due to the ability of the silicon carbide to capture particulates and impurities smaller than the pore size of the substrate material. Finally, the filter forming technique of the present invention is relatively inexpensive to perform and leads to the production of low cost filters which can be discarded after use.

To demonstrate the present invention, the following illustrative example was performed.

EXAMPLE

A two inch thick tile of alumina foam material having a porosity of 30 ppi was coated with a slurry having the following composition: 4 parts water, 1 part monoaluminum phosphate, 0.6 parts silicon carbide and 0.01% by volume Kodak Photo-Flo 200 as a wetting agent. As described above, the water, the phosphate and the wetting agent were mixed together and the silicon carbide was added to the mixture. Coating of the tile was done by pouring the slurry through the porous body several times.

After coating, the excess slurry was permitted to drain off the tile. The coated tile was then furnace dried at 400° F. for two hours. Subsequent to the furnace drying, the coated tile was fired at 1000° F. for 2 hours to activate the phosphate bond which bonds the silicon carbide to the filter material.

The coated filter was then placed in a transfer trough and used to filter an 800 pound copper alloy C19400 melt. After filtration, the melt exhibited a very significant reduction in the size of undesirable inclusions. Before filtration, the melt had particulates as large as 1000 $\mu$m. After being passed through the filter, the melt contained no particulates greater than about 60 $\mu$m.

While it is preferred to form the filter of the present invention from a rigid porous substrate material, the technique of the present invention could be used to form a silicon carbide coating on a pliant substrate material.

While it is preferred to form the filter of the present invention from an alumina foam substrate material, it is possible to form the filter of the present invention from other rigid ceramic or refractory substrate materials.

While it is preferred to use an orthophosphate as a binding agent in the slurry, it is possible to use other materials such as sodium silicate as the binding agent. In addition, Kaolin, Bentonite and other slurry conditioners may be added to the foregoing slurry compositions. Kaolin is a clay composed of mainly alumina and silica. Bentonite is a naturally occuring clay composed principally of aluminum and silicates usually with some magnesium and iron.

While the invention has been described in the context of forming filters for filtering molten metal, it is also possible to use the process of the present invention to form materials for linings, passageways and other structures which the molten metal contacts.

The patents set forth in the specification are intended to be incorporated by reference herein.

It is apparent that there has been provided in accordance with this invention a technique for forming silicon carbide coated porous filters which fully satisfies the objects, means and advantages set forth hereinbefore. While the invention has been described in combination with specific embodiments thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

What is claimed:

1. A process for forming a filter to be used in removing unwanted impurities and contaminants from molten metal, said process comprising:
   preparing a slurry containing silicon carbide particles and having a viscosity in the range of from about 1 centipoise to about 50 centipoise;
   said preparing step comprising mixing together an inactive carrying medium, a binding agent and a wetting agent;
   said preparing step further comprising adding powdered silicon carbide having a maximum settling rate of about 0.1 mm/min. to said mixture to form said slurry;
   providing a porous substrate material having an open cell structure characterized by a plurality of interconnected voids; and
   forming a thin substantially uniform silicon carbide coating on said substrate material, said coating forming step comprising impregnating said substrate material with said slurry.

2. The process of claim 1 wherein said preparing step further comprises:
   continually stirring said slurry to keep said silicon carbide in suspension.

3. The process of claim 1 wherein said forming step further comprises:
   draining excess slurry from said substrate material; and
   heating said impregnated substrate material to a temperature in the range of about 300° F. to about 500° F. for about one to three hours to substantially prevent any foaming of said coating during subsequent processing.

4. The process of claim 3 wherein said forming step further comprises:
   firing said impregnated material at a temperature of about 800° F. to about 2100° F. for about one to about three hours to bond said silicon carbide coating to said substrate material.

5. The process of claim 4 wherein said firing step comprises:
   firing said impregnated material at a temperature of about 1000° F. to about 1500° F.

6. The process of claim 1 wherein said impregnating step comprises immersing said substrate material in said slurry.

7. The process of claim 1 wherein said impregnating step comprises pouring said slurry through said substrate material.

8. The process of claim 1 wherein said mixing step comprises:
   mixing water, an orthophosphate binding agent, and ethylene glycol together at ambient temperature.

9. The process of claim 1 wherein said substrate material providing step comprises:
   providing a rigid ceramic foam tile.

10. The process of claim 1 wherein said slurry preparing step comprises:
    preparing a slurry containing from about 5% to about 20% by volume silicon carbide, from about 2% to about 50% by volume mono-aluminum phosphate, from about 0.001% to about 0.01% by volume ethylene glycol and the balance essentially water.

11. The process of claim 1 wherein said slurry preparing step comprises:
    preparing a slurry consisting essentially of about 10% to about 15% by volume silicon carbide, about 10% to about 10% to about 0.01% by volume ethylene glycol and the balance essentially water.

12. The process of claim 11 further comprising:
    preparing said slurry so that the ratio of said water to said mono-aluminum phosphate is at least about 4:1 and so that said viscosity is in the range of about 5 to about 30 centipoise.

13. The filter formed by the process of claim 1.

* * * * *